F. ROBINSON.
HOSE COUPLING.
APPLICATION FILED JUNE 15, 1910.
997,855.
Patented July 11, 1911.
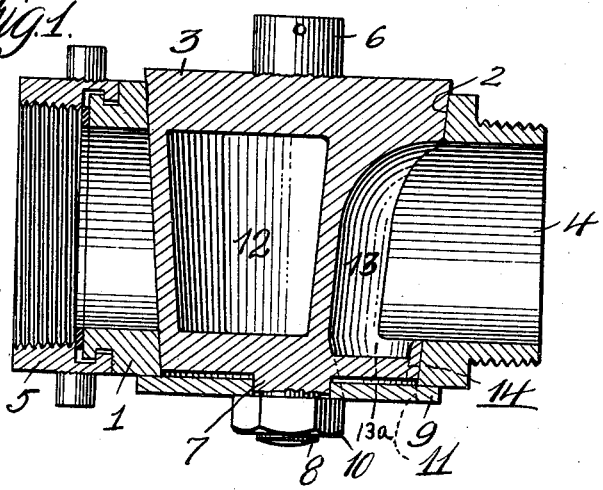
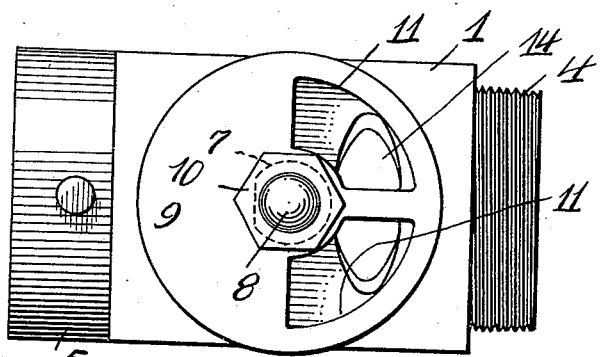
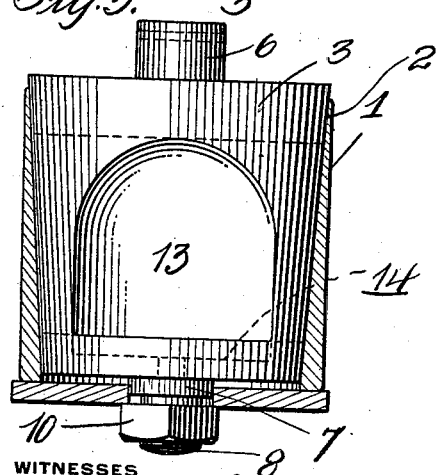
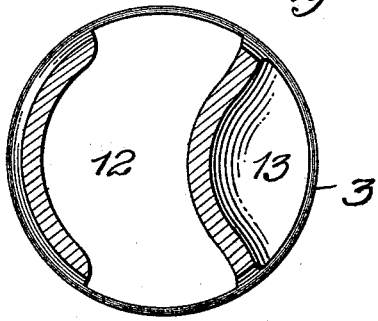
WITNESSES
Samuel Payne
K. H. Butler
INVENTOR
Forster Robinson
by
Attorneys.

UNITED STATES PATENT OFFICE.

FORSTER ROBINSON, OF CASEY, ILLINOIS.

HOSE-COUPLING.

997,855.　　　　　　Specification of Letters Patent.　　Patented July 11, 1911.

Application filed June 15, 1910.　Serial No. 566,940.

*To all whom it may concern:*

Be it known that I, FORSTER ROBINSON, a citizen of the United States of America, residing at Casey, in the county of Clark and State of Illinois, have invented certain new and useful Improvements in Hose-Couplings, of which the following is a specification, reference being had therein to the accompanying drawing.

This invention relates to hose couplings and the object thereof is to provide a coupling of such class in a manner as hereinafter set forth which is particularly adapted for connecting a fire hose either to a fire plug or to an engine.

At the present time considerable trouble is experienced by firemen in dragging a charged hose to a building due to the weight of the water within the hose and to relieve the hose of such weight is the essential object of the invention.

To this end the invention consists in providing a coupling between a fire hose and a fire plug or engine with means in a manner as hereinafter set forth whereby when the supply of water is cut-off from the fire hose and the firemen start to drag or carry the hose to an elevated point, the water contained in the hose can be discharged whereby the weight carried will be materially reduced which will enable the firemen to more quickly position the hose than would be the case if the firemen were not only compelled to carry the weight of the hose but also the weight of the water.

Further objects of the invention are to provide a coupling for the purpose set forth which shall be simple in its construction and arrangement, strong, durable, efficient in its use, conveniently used for connecting a fire hose to a fire plug or engine, and inexpensive to manufacture.

With the foregoing and other objects in view, the invention consists of the novel construction, combination and arrangement of parts as hereinafter more specifically described and illustrated in the accompanying drawings, wherein is shown one embodiment of the invention, but it is to be understood that changes, variations, and modifications can be resorted to which come within the scope of the claim hereunto appended.

In the drawings wherein like reference characters denote corresponding parts throughout the several views: Figure 1 is an elevation in longitudinal section of a hose coupling in accordance with this invention. Fig. 2 is a plan of the same. Fig. 3 is a vertical cross sectional view of the valve body showing the valve plug in elevation, and Fig. 4 is a horizontal sectional view of a detached valve plug.

Referring to the drawing by reference numerals, 1 denotes a rectangular valve body provided with a central vertical and tapering opening 2 constituting a seat for a tapering plug 3. The valve body 1 has one end thereof provided with an exteriorly threaded nipple 4 in communication with the opening 2 and the opposite end of said valve body is provided with an interiorly threaded revoluble coupling member 5 for connecting the valve body to the outlet of a fire plug (not shown), while the nipple 4 is provided whereby a hose can be coupled to said valve body. The plug 3 has the upper end thereof provided with a stem 6 for a wrench or suitable instrument (not shown) and the lower end of said plug is provided with a depending stem 7 which is reduced and threaded, as at 8. The plug 3 is retained within the opening 2 by a circular plate 9 mounted upon the stem 7 and retained in engagement with the bottom of the valve body 1 by a nut 10 screwed upon the reduced end 8 of the stem 7. The plate 9 is provided with two segment shaped openings 11 at the front edge thereof, for a purpose that will presently appear. The plug 3 is provided with a sinuous or curved port or passage 12 and having its ends adapted to register with the nipple 4 and the member 5 to establish communication between the nipple 4 and the coupling member 5 for the passage of water direct from a fire hydrant or plug to the hose connected to the nipple 4. The port or passage 12 is curved adjacent to one side of the plug to provide sufficient clearness and material for the formation in the periphery of the plug of a drain passage consisting of a recess 13, a vertically-disposed pocket 13ª positioned inwardly of the periphery of the plug and an opening 14 in the bottom of said pocket which registers with the opening 11 in the plate 9.

Briefly, the manner of using the hose coupling is as follows. Assuming that water is passing through the port or passage 12 from a fire hydrant to a hose and that it is desired to elevate the hose or change its position, the plug 3 is rotated a quarter of a revolution to shut-off the supply of water to the valve body and place drain passage in position to establish communication between the nipple 4 and the openings 11, whereby the back pressure within the hose can be drained thus allowing the hose to be easily and quickly moved by firemen. After the hose has been again positioned the plug 3 can be rotated another quarter of a revolution to open the valve and allow the pressure of water from a fire hydrant to pass directly into the hose.

It is obvious that the device can be employed for draining the hose after a fire has been extinguished and that it lessens the weight of the hose and allows it to be more quickly handled.

What I claim, is:

A hose coupling comprising a valve body having an inlet and an outlet, one arranged opposite the other, a plug rotatably mounted in said body and provided with a sinuous passage having the ends thereof in alinement with each other and said ends adapted when the plug is shifted to register with said inlet and outlet for establishing communication therebetween to allow of the passage of water through the plug, said plug provided with a depending screw threaded stem, a plate arranged at the bottom of the valve body and through which extends said stem, said plate formed with openings, means mounted upon the stem for maintaining the plate in position at the bottom of the valve body, and said plug having a drain passage adapted to communicate with said outlet when the plug is shifted to cut off communication between said inlet and outlet, said passage comprising a recess in the periphery of the plug, a pocket arranged inwardly of the periphery of the plug, below said opening and into which the recess opens at the bottom of the latter, the bottom of said pocket having an oval-shaped opening communicating with the openings in the plate.

In testimony whereof I affix my signature in the presence of two witnesses.

FORSTER ROBINSON.

Witnesses:
C. W. KIRKWOOD,
R. A. YOUNG.

---

Copies of this patent may be obtained for five cents each, by addressing the "Commissioner of Patents, Washington, D. C."